United States Patent
Noller

(10) Patent No.: US 7,465,331 B2
(45) Date of Patent: Dec. 16, 2008

(54) DEVICE FOR CLEANING VEHICULAR EXHAUST GAS

(75) Inventor: Christoph Noller, Königsbrunn (DE)

(73) Assignee: EMCON Technologies LLC, Wilmington, DE (US)

( * ) Notice: Subject to any disclaimer, the term of this patent is extended or adjusted under 35 U.S.C. 154(b) by 624 days.

(21) Appl. No.: 11/081,415

(22) Filed: Mar. 16, 2005

(65) Prior Publication Data

US 2005/0204711 A1 Sep. 22, 2005

(30) Foreign Application Priority Data

Mar. 18, 2004 (DE) .................. 10 2004 013 458

(51) Int. Cl.
| | |
|---|---|
| B01D 24/00 | (2006.01) |
| B01D 39/14 | (2006.01) |
| B01D 50/00 | (2006.01) |
| B01D 53/34 | (2006.01) |
| F01N 3/02 | (2006.01) |
| F01N 3/00 | (2006.01) |

(52) U.S. Cl. .................... 55/523; 55/524; 55/502; 60/311; 422/180; 422/179; 422/168

(58) Field of Classification Search ............ 55/502, 55/523, 524; 60/311; 422/180, 179, 168
See application file for complete search history.

(56) References Cited

U.S. PATENT DOCUMENTS

| | | |
|---|---|---|
| 4,180,544 A | 12/1979 | Santiago |
| 4,270,936 A | 6/1981 | Mann |
| 4,276,066 A | 6/1981 | Bly et al. |
| 4,281,512 A | 8/1981 | Mills |
| 4,319,896 A | 3/1982 | Sweeney |
| 4,335,574 A | 6/1982 | Sato et al. |
| 4,373,330 A | 2/1983 | Stark |
| 4,381,643 A | 5/1983 | Stark |
| 4,481,767 A | 11/1984 | Stark |
| 4,520,624 A | 6/1985 | Kiyota et al. |
| 4,573,317 A | 3/1986 | Ludecke |
| 4,651,524 A | 3/1987 | Brighton |
| 4,730,455 A | 3/1988 | Pischinger et al. |
| 4,840,028 A | 6/1989 | Kusuda et al. |
| 4,848,083 A | 7/1989 | Goerlich |

(Continued)

FOREIGN PATENT DOCUMENTS

DE 2723532 11/1978

(Continued)

OTHER PUBLICATIONS

European Search Report and Annex Thereto (3 pages) (Jul. 12, 2005).

*Primary Examiner*—Walter D Griffin
*Assistant Examiner*—Amber Miller Harris
(74) *Attorney, Agent, or Firm*—Barnes & Thornburg LLP

(57) ABSTRACT

A device for cleaning vehicular exhaust gas, in particular a diesel exhaust particle filter, comprises a filter body which has gas flowing through it, is composed of cuboid individual bodies and has been machined on the circumferential surface. Ring segment type clamping members made of warp-knitted or woven filaments rest against the end face of those individual bodies which have undergone more machining than other individual bodies situated on the outer circumference of the filter body.

14 Claims, 4 Drawing Sheets

U.S. PATENT DOCUMENTS

| | | | |
|---|---|---|---|
| 4,851,015 A | 7/1989 | Wagner et al. |
| 5,024,054 A | 6/1991 | Barris et al. |
| 5,048,287 A | 9/1991 | Howe et al. |
| 5,063,737 A | 11/1991 | Lopez-Crevillen et al. |
| 5,065,574 A | 11/1991 | Bailey |
| 5,094,075 A | 3/1992 | Berendes |
| 5,140,814 A | 8/1992 | Kreutmair et al. |
| 5,211,009 A | 5/1993 | Houben et al. |
| 5,251,564 A | 10/1993 | Rim et al. |
| 5,365,733 A | 11/1994 | Takeshima et al. |
| 5,656,048 A | 8/1997 | Smith et al. |
| 5,853,459 A | 12/1998 | Kuwamoto et al. |
| 5,934,069 A | 8/1999 | Hertl et al. |
| 5,946,906 A | 9/1999 | Akazaki et al. |
| 6,012,284 A | 1/2000 | Tanaka et al. |
| 6,063,150 A | 5/2000 | Peter et al. |
| 6,182,445 B1 | 2/2001 | Yamazaki et al. |
| 6,233,926 B1 | 5/2001 | Bailey et al. |
| 6,321,533 B1 | 11/2001 | Watanabe et al. |
| 6,327,852 B1 | 12/2001 | Hirose |
| 6,344,306 B1 | 2/2002 | Fujiyoshi et al. |
| 6,422,006 B2 | 7/2002 | Ohmori et al. |
| 6,694,727 B1 | 2/2004 | Crawley et al. |

FOREIGN PATENT DOCUMENTS

| | | |
|---|---|---|
| EP | 1 236 872 A1 | 1/2002 |
| EP | 1236872 | 9/2002 |
| GB | 2 134 407 A | 2/1984 |
| JP | 01240716 | 9/1989 |
| WO | WO 03/093657 A1 | 11/2003 |

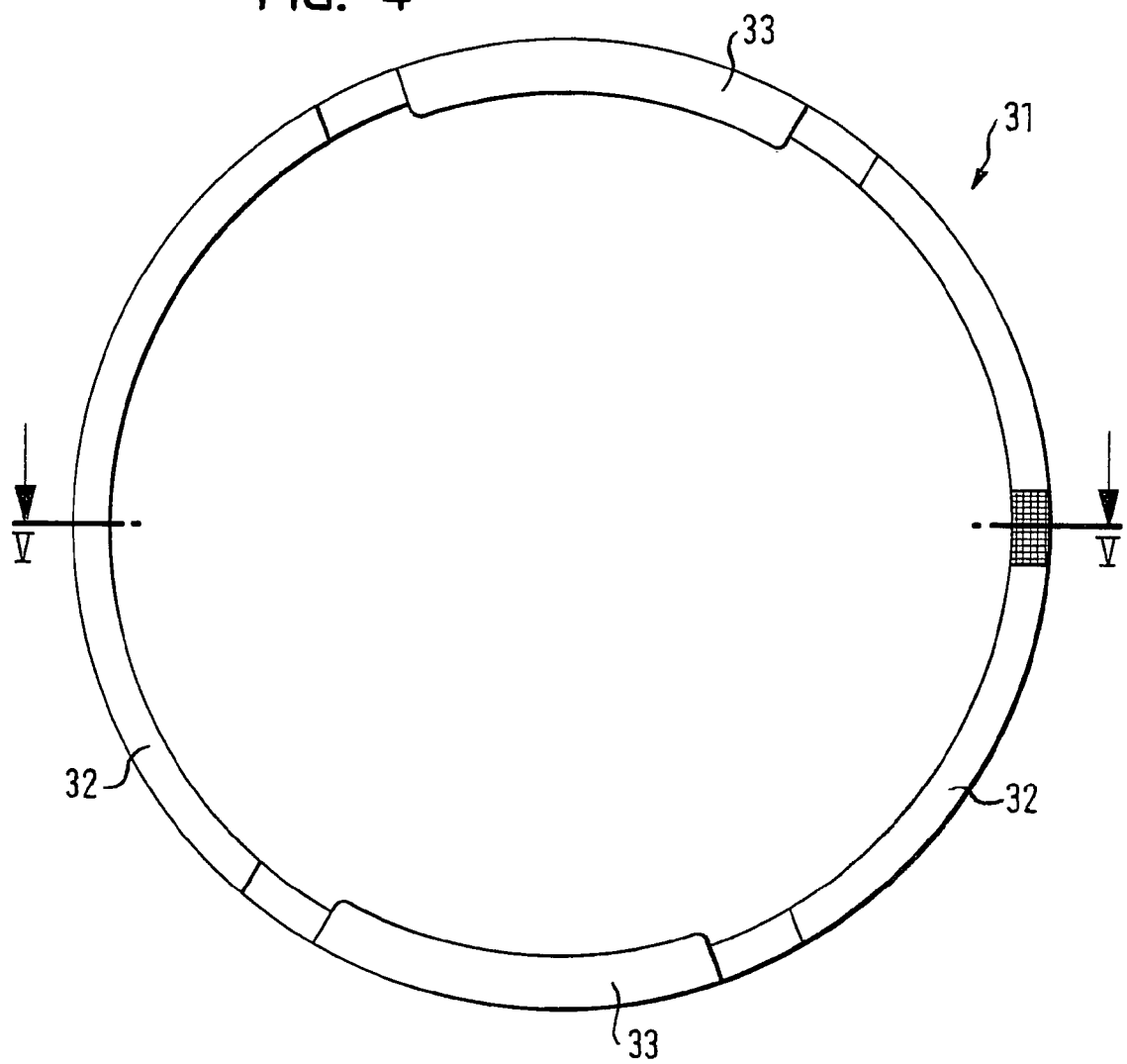
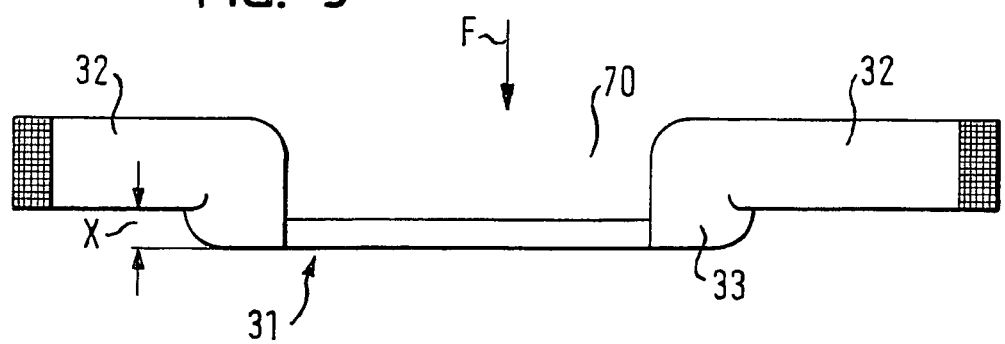

DEVICE FOR CLEANING VEHICULAR EXHAUST GAS

This application claims the benefit under 35 U.S.C. § 119 of DE 102004013458.9 which was filed in the Federal Republic of Germany on Mar. 18, 2004 and is hereby incorporated by reference herein.

FIELD OF THE DISCLOSURE

The present application relates generally to a device for cleaning vehicular exhaust gas. More particularly, it relates to a diesel exhaust particle filter.

BACKGROUND OF THE DISCLOSURE

Devices for cleaning vehicular exhaust gas, in particular diesel exhaust particle filters, may include a filter body (also called substrate or monolithic body) which has gas flowing through it and an inflow side end face and an effusion side end face, as well as a circumferential wall, a housing surrounding the filter body, as well as ring segment type, axially compressed clamping members provided on the outer edge of at least one end face between the latter and the housing.

Devices of this type are, for instance, catalytic exhaust gas cleaning devices, or filters for diesel exhaust particulates, to which the invention refers in particular.

The filter bodies may be composed by extruded, one-piece, monolith-like individual bodies which are glued together and, in most cases, are of SiC material. These elongated individual bodies are available on the market mainly with a square cross section. The individual bodies have a front face with numerous inlet channels starting from one front face on the inlet side and ending in a blind hole. The inlet channels usually have a square cross section and are arranged in a honeycomb manner. Immediately adjacent to the inlet channels, outlet channels are provided which are not in an immediate flow connection with the inlet channels. The outlet channels are also of square cross section and are arranged in a honeycomb manner. However, the outlet channels start from the opposite front face (outlet side) and end in blind holes. The exhaust gas flows from the inlet front face into the numerous inlet channels and diffuses through the adjacent walls into the outflow channels. Soot particles are retained within the inflow channels. Catalytic converters for exhaust gas have corresponding constructions and comprise a filter body with a catalytic coating.

A generic device is known from EP 1 236 872 A1. Here, a one-piece filter body is mounted in the housing by a ring of warp-knitted or woven filaments being positioned at the two axial ends of the filter body, more specifically at the transition between the end faces and the circumferential wall, and being clamped between the filter body and the housing. It is via the two rings of warp-knitted or woven filaments that the force is transferred which is necessary for supporting the ceramic filter body usually structured like a honeycomb. The ring of warp-knitted or woven filaments has protrusions extending in front of the associated end face. These portions are termed clamping members in the following.

SUMMARY OF THE DISCLOSURE

According to the present disclosure, there is provided a device for cleaning vehicular exhaust gas, in particular a diesel exhaust particle filter. The device comprises a filter body having gas flowing through it and an inflow side end face and an effusion side end face, as well as a circumferential wall. The device further comprises a housing surrounding the filter body as well as ring segment type, axially compressed clamping members provided on the outer edge of at least one end face between the at least one end face and the housing. The filter body is composed of elongate, cuboid, monolith-like, one-piece individual bodies and the circumferential surface of the filter body is machined. The clamping members are positioned in the region of those individual bodies situated on the outer circumference of the filter body which have undergone a heavier or more machining than other individual bodies situated on the outer circumference of the filter body. Such an arrangement facilitates production at reasonable costs and has a high efficiency with regard to the cleaning effect or particle retaining capacity.

The device does not provide a filter body consisting of one single part, as is proposed in prior art, but a filter body composed of a plurality of individual bodies which usually have a square cross-section. These individual bodies are one-piece bodies per se, and will be glued to other individual bodies. The resulting, large filter body is machined on its outer circumference. The individual bodies are mass products, so that the assembling of the filter bodies from individual bodies and the superficial machining is cheaper than the one-off production of a single filter body having the final, desired outer geometry. Through machining, however, the individual bodies situated on the outer circumference will be reduced in their cross-sectional area to a more or less degree. The throughput, i.e. the performance of the machined individual body suffers from a superproportional reduction by the machining itself, compared with the loss of cross-sectional area due to machining. The clamping members are now positioned in the region of those individual bodies situated on the outer circumference which have undergone a heavier machining than others, i.e. individual bodies that have been excessively cut down in terms of their throughput and, with this, in their particle retaining capacity. If the clamping members rest against the end face of these individual bodies which anyway exhibit a severely limited performance and cover a further part of the front face, the effective cross-sectional area will be reduced resulting in a smaller loss of the performance of the entire filter body than an arrangement with individual bodies that are hardly machined or not machined at all. Consequently, the clamping members are not provided in the region of the individual bodies that have been machined to the lowest degree.

In an exemplary embodiment it is assumed that prior to the machining of the filter body all the individual bodies had the same cross-sectional area and had, for example, the same outer dimensions (seen in cross section). Consequently, the clamping members exemplarily rest against those individual bodies situated on the outer circumference which have a smaller cross-sectional area than other individual bodies situated on the outer circumference.

Hence, the clamping members should not cover those individual bodies on the circumference which are machined to the lowest degree, and, all the more, unmachined individual bodies neither.

Exemplarily, in this context, the clamping members rest against at least those individual bodies situated on the outer circumference whose cross-sectional area is even the smallest one. Since the cross-sectional area of these individual bodies, which have undergone the heaviest machining, may be so small that supporting the filter body exclusively through these individual bodies of smallest cross-section is impossible, the clamping members may also rest against adjoining individual bodies that have undergone a heavy machining. In so doing, attention should be paid to the fact that the clamping members only rest against such individual bodies situated on the outer circumference which have a cross-sectional area reduced by more than 50% through machining. In terms of their performance, the individual bodies with a larger cross-sectional area are too "precious" to additionally cover portions of the end face.

The clamping members exemplarily are made of metal fibers, for instance of warp-knitted or woven filaments.

The warp-knitted or woven filaments may be provided with embedded fibers and/or sealing agents, i.e. additionally have a sealing effect.

The segment type clamping members are portions of a ring and are connected to each other via ring portions which are situated to the side of and outside the clamping members. The portions which connect the clamping members, seen onto the end face associated to the clamping members, may be situated to the side of and outside the end face, i.e. in particular between the circumferential surface of the filter body and the housing. It is in this region that a lateral clamping force is transferred between the housing and the filter body; optionally, still an axial clamping force acts between the end wall of the housing, the clamping members and the associated end face of the filter body.

According to an exemplary embodiment the clamping members extend along the circumference of the filter body up to a maximum of only ⅓ of this circumference.

The above and other features of the present disclosure will become apparent from the following description and the attached drawings.

BRIEF DESCRIPTION OF THE DRAWINGS

The above and further features of the present disclosure will be apparent from the following description and the following drawings to which reference is made and in which:

FIG. 4 is a top view of a ring of warp-knitted or woven filaments that can be employed, FIG. 5 is a sectional view along line V-V through the ring of warp-knitted or woven filaments according to FIG. 4.

DETAILED DESCRIPTION OF THE DRAWINGS

Figure 1:
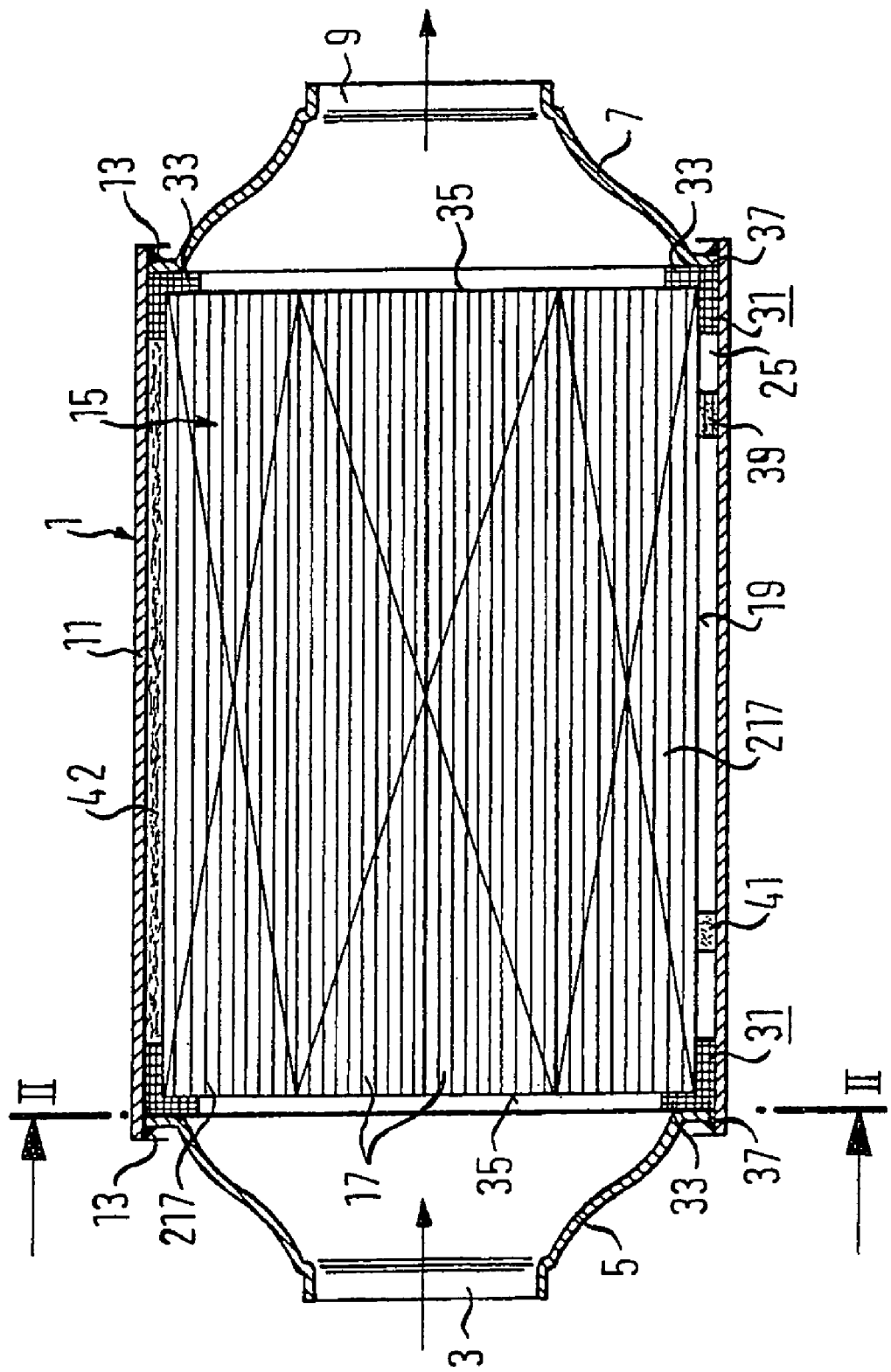
FIG. 1 shows a longitudinal section through a device according to first and second embodiments (upper and lower half, respectively), realized as diesel exhaust particle filters.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

FIG. 1 illustrates a device used for cleaning vehicular exhaust gas and situated in the exhaust tract of the vehicle. The device shown is a diesel exhaust particle filter, but it may also be designed as a catalytic converter.

The device has an elongate housing 1 composed of several parts, namely a funnel-shaped portion 5 provided with an inflow port 3, a funnel-shaped portion 7 provided on the opposite end and having an effusion port 9, as well as a circumferential wall 11 formed by a deformed tube or by folding a sheet of metal. The funnel-shaped portions 5, 7 are welded to the circumferential wall 11 and project into the interior of the latter by a small distance (see FIG. 2). The weld seams have reference symbol 13.

Accommodated in the interior of the housing 1 is a filter body 15 which is composed of a plurality of cuboid, one-piece, monolith-like individual bodies 17, 117, 217, 317. In particular, the individual bodies 17-317 are extruded SiC-bodies, the length of which is equal to the length of the entire filter body 15 and which have a rod-shaped appearance. In particular, the individual bodies 17-317 consist of individual bodies with the same square cross-section, whose marginal areas are glued to adjoining individual bodies 17-117.

Figure 2:
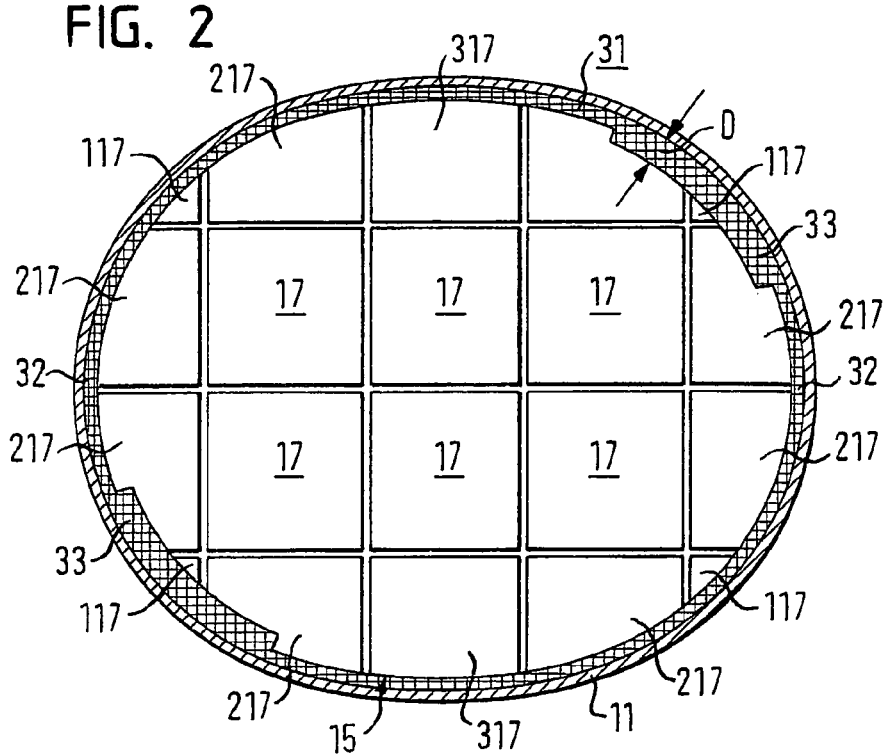
FIG. 2 is a sectional view through the diesel exhaust particle filter according to FIG. 1.

FIG. 2 shows a sectional view as seen onto an end face 35 of the filter body 15 shown in FIG. 1. As delivered from the factory, the individual bodies 17-317 are supplied with an unmachined external surface; after having been glued to each other to form the filter body 15, they are machined (chip removal cutting) on the circumferential side such that the circumferential surface 19 has an oval extension. This means that the entire, resultant round outer circumference of the filter body 15 is machined on the circumferential surface 19.

The filter body 15 consists of internal individual bodies 17 which are unmachined on their circumferential surface, as well as of machined individual bodies 117, 217 and 317 situated on the outer circumference. The individual bodies 117 are the ones on the outer circumference which have undergone the heaviest machining and exhibit the smallest cross-sectional area. The individual bodies 217, situated on the outer circumference and directly adjoining the individual bodies 117, also have undergone a relatively heavy machining and exhibit a cross-sectional area which is reduced by more than 50% relative to the initial state (see individual body 17). On the other hand, the individual bodies 317 situated on the outer circumference have undergone a relatively slight machining, and their cross-sectional area is reduced by less than 50% compared with their original state.

The individual bodies 17-317 have numerous inflow channels with a honeycomb-like or square cross-section, which alternate with essentially square walls, so that a kind of honeycomb structure or chessboard pattern arises. The inflow channels extend deeply into the individual bodies 17-317 and end therein in each case as a blind hole. Effusion channels protrude from the opposite end face 35 (effusion side) into the walls and end therein likewise as blind holes. Thus, on the opposite end face 35 there also arises a view with a similar honeycomb or chessboard pattern, which just is offset with respect to the pattern at the inflow side.

The actual flow surface area of the entire filter body 15 is made up of the sum of the actual flow surface areas of the individual bodies 17-317, the particle retaining capacity mainly being determined by the capacity of the individual bodies 17 and 317.

The circumferential wall 11 of the housing 1 surrounds the filter body 15 illustrated in FIG. 1 with an air gap 25 with constant width, which amounts to slightly more than 3 millimeters in thickness. This means that the circumferential wall 11 continues along the outer contour of the filter body 15 so as to be evenly spaced apart therefrom.

The supporting of the filter body 15 in the housing 1 is accomplished by an axial and/or lateral (radial) clamping in the housing 1. Provided on the axial ends of the filter body 15 is a resilient sealing body in the form of a ring 31 of warp-knitted or woven filaments, which continuously extends in the circumferential direction and is provided with fibers or a sealing material. This ring 31 of warp-knitted or woven filaments lies between the circumferential surface 19 of the filter body 15 and the inner side of the circumferential wall 11 (FIG. 1). The ring 31 of warp-knitted or woven filaments has two circumferentially spaced, ring segment type clamping members 33 which are clamped on the outer edge of the end face 35 of the filter body 15 between said end face and a plane, annular flange portion 37 of the associated funnel-shaped portion 5, 7. The clamping members 33 are portions of the ring 31 of warp-knitted or woven filaments, only have a low lateral thickness D of few millimeters and are connected with each other by the portions 32 of ring 31. The clamping members 33 may be portions of the single filament which also forms the ring 31. Another embodiment makes provision that there are provided separate filaments for the ring 31 and the clamping members 33, with these filaments being connected at a transition by means of a knitted or woven connection.

As can be seen from FIG. 2, the ring 31 of warp-knitted or woven filaments has two clamping members 33 formed thereon, which essentially are situated so as to lie opposite each other, relative to the center of area. Here, the clamping members 33 are arranged such that their centers rest against the individual bodies 117 which have undergone the heaviest machining, partially covering the end face of these, so that the effective area of flow thereof will be reduced. The clamping members 33, however, continue so as to extend as far as to the adjoining individual bodies 217; they do not extend along the entire outer circumference of the individual bodies 217, however, so that only a section of the individual bodies 217 on the outer edge is covered by the clamping members 33.

In case that the filter body 15 is to be positioned in the housing 1 almost exclusively by an axial clamping, then the clamping force which is exerted through the clamping members 33 on the filter body 15 amounts at ambient temperature to approximately 5000 N, for example. The lateral clamping force, exerted through the circumferential wall 11 on the circumferential surface 19 of the filter body 15, is extremely low (surface pressure about 0.05 N/mm$^2$) compared with the axial prestressing force.

The ring 31 of warp-knitted or woven filaments, which is circumferentially closed and is provided between the circumferential wall 11 and the circumferential surface 19, serves for preventing any exhaust gas bypass flows. In case that the ring 31 of warp-knitted or woven filaments should not be sufficient for this, it is possible to additionally provide sealing strips 39 or a sealing paste 41 (see lower half in FIG. 1) at a place as close as possible to the end faces 35 of the filter body 15; theses sealing means would each surround the filter body 15 so as to be circumferentially closed. As an alternative, for thermal insulation there could also be provided an insulation mat or swelling mat 42 (see upper half in FIG. 1) in this zone.

Figure 3:
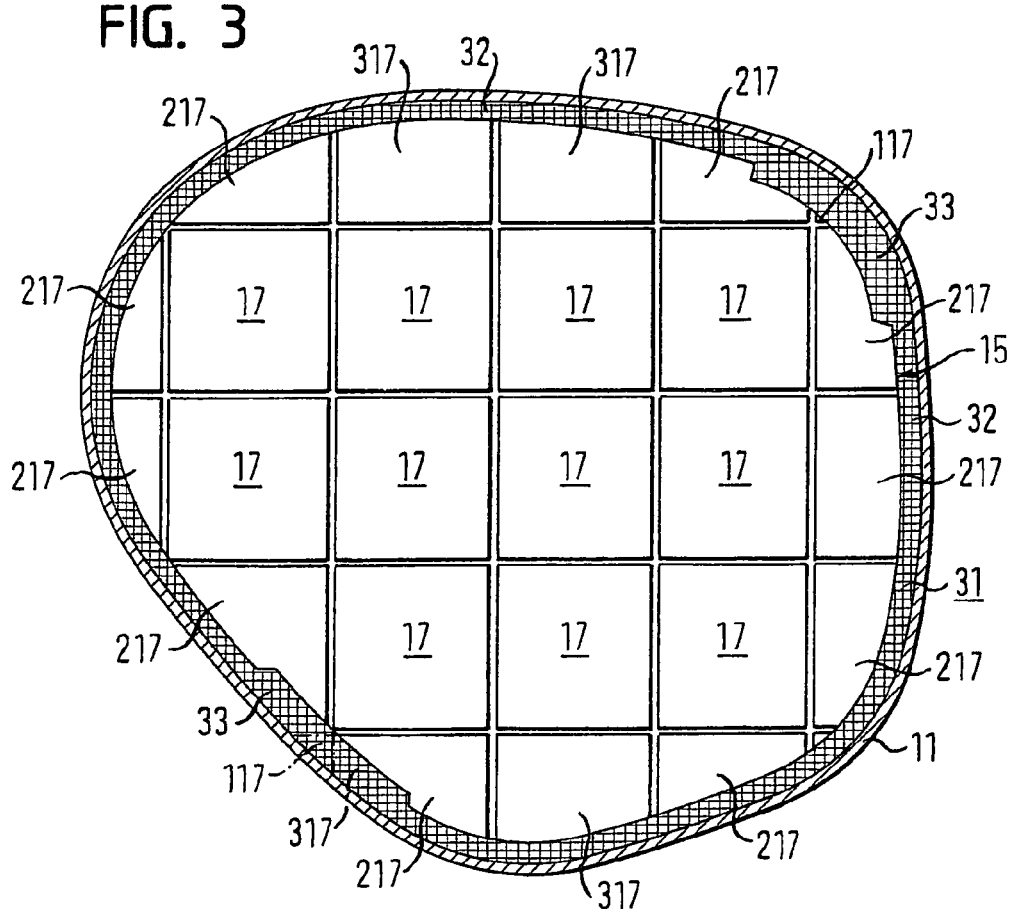
FIG. 3 is a sectional view through a diesel exhaust particle filter with a different cross-sectional geometry.

With the embodiment according to FIG. 3 the filter body 15 has several unmachined individual bodies 17 as well as machined individual bodies 317 situated on the outer circumference which have their cross-sectional area reduced by less than 50%, and individual bodies 117, 217 which have their cross-sectional area reduced by more than 50%, of which the individual bodies 117 have undergone the heaviest machining and possess the smallest cross-sectional area. The lowermost individual body 117 is completely covered by a clamping member 33 which partially extends as far as into the neighboring individual bodies 217. The right-hand clamping member 33 at the top opposite the left-hand clamping member 33 at the bottom is similarly arranged, with the right-hand individual body 117 at the top still having a portion that is not covered by the clamping member 33. The filter body 15 shown in FIG. 3 has a rounded, but irregular outer geometry, as seen in cross-section. Here too, the clamping members 33 do not extend across the end face of those individual bodies 17 which are unmachined on their surface.

Concerning the axial and lateral clamping of the filter body 15 in the housing 1, there applies to the embodiment of FIG. 3 what has been said regarding FIGS. 1 and 2.

The ring 31 of warp-knitted or woven filaments shown in FIGS. 4 and 5 likewise has two clamping members 33, these being offset to the portions 32 of the ring 31 of warp-knitted or woven filaments by a distance X. The clamping members 33 are formed in that the ring 31 is plastically deformed by applying axial forces F, so that indentations 70 and bulges will be produced, with the clamping members 33 being constituted by the bulges.

The embodiments shown in FIG. 6 (upper and lower half) essentially correspond to the embodiments shown in FIG. 1, which is why only the differences will be examined in the following and the already introduced reference symbols will be used for elements with identical function.

Figure 6:
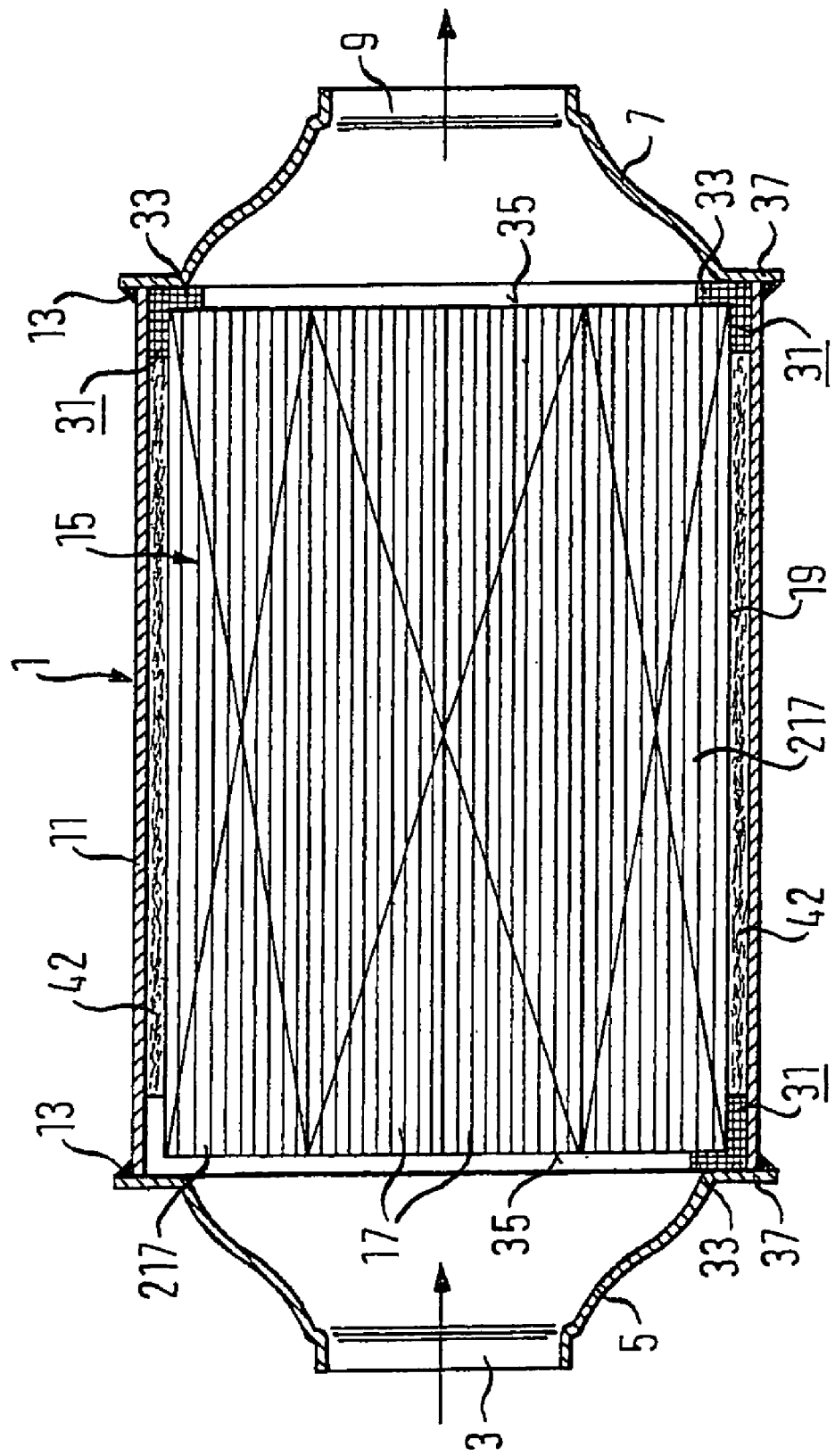
FIG. 6 is a longitudinal section through a device according to two further embodiments (upper and lower half, respectively), which are realized as diesel exhaust particle filters.

The two embodiments according to FIG. 6 are distinguished in that the filter body 15 is almost exclusively clamped in the housing 1 by a lateral force. To achieve this, first the insulation or swelling mat 42 is laid around the filter body 15. Likewise, the one or more rings 31 are attached to the end faces of the filter body 15. According to the embodiment shown in the upper half there is provided one ring 31 only, in fact on the downstream end face 35, whereas in the embodiment according to the lower half each of the two end faces is provided with a ring 31. In the next step and for forming the circumferential wall, there will be wrapped, applying a predefined force, a sheet of metal around the unity made up of filter body 15, swelling mat 42 and the one or more rings 31. In so doing, a high lateral force is exerted on the filter body 15 through which it is retained within the circumferential wall 11 and in the housing 1 later on. Then the funnel-shaped portions 5, 7 will be mounted on the two end faces and welded with the circumferential wall 11. As the one or more rings 31 axially protrude outside beyond the circumferential wall 11 prior to welding, the clamping members 33 will be axially compressed during mounting the associated funnel-shaped portion 5, 7. The problem is here that the ring 31, when the circumferential wall 11 has been wrapped, could protrude not only axially towards outside, but also radially in the zone of its protruding portion. During mounting the funnel-shaped portions 5, 7 to the end face of the circumferential wall 11 it could happen that the part of the ring 31 projecting from the tube is caught between the portions 5, 7 and the tube proper, causing a leakage or problems during welding at a later point in time. For this reason it is of advantage if the ring has an axial offset between the portions 32 and the clamping members 33, as is shown in FIGS. 4 and 5.

As an alternative to the embodiment according to FIG. 6 it would also be possible, however, to fold the circumferential wall 11 at its axial ends laterally towards inside in order to axially position the one or more rings 31.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The ivention claimed is:

1. A device for cleaning vehicular exhaust gas, comprising
a filter body having gas flowing through it and an inflow side end face, an effusion side end face, and a circumferential wall,
a housing surrounding the filter body,
ring segment type, axially compressed clamping members provided on an outer edge of at least one end face between the at least one end face and the housing,
characterized in that
the filter body is composed of elongate, cuboid individual bodies and the circumferential wall of the filter body is machined and
the clamping members are positioned in a region situated on an outer circumference of the filter body associated with individual bodies of the cuboid individual bodies which have undergone more machining than other individual bodies of the cuboid individual bodies situated on the outer circumference of the filter body.

2. The device according to claim 1, characterized in that the clamping members are arranged on opposite portions of the filter body.

3. The device according to claim 1, characterized in that the clamping members rest against those individual bodies situated on the outer circumference which have a smaller cross-sectional area than other individual bodies situated on the outer circumference.

4. The device according to claim 1, characterized in that the clamping members rest against those individual bodies situated on the outer circumference which have a cross-sectional area that is reduced by more than 50 % due to machining.

5. The device according to claim 1, characterized in that the clamping members do not cover the end face of unmachined individual bodies.

6. The device according to claim 1, characterized in that the clamping members rest against those individual bodies situated on the outer circumference whose cross-sectional area is smallest.

7. The device according to claim 1, characterized in that the clamping members are made of metal fibers selected from warp-knitted and woven filaments.

8. The device according to claim 1, characterized in that the clamping members are provided with embedded fibers and/or sealing agents.

9. The device according to claim 1, characterized in that the segment type clamping members are portions of a ring.

10. The device according to claim 9, characterized in that the portions of the ring, which connect the clamping members, are situated to the side of and outside the clamping members.

11. The device according to claim 9, characterized in that the ring, seen onto the end face of the filter body associated to the clamping member, is situated to the side of and outside the end face.

12. The device according to claim 9, characterized in that the ring has a portion which extends between the circumferential surface and the housing and is clamped between the filter body and the housing.

13. The device according to claim 9, characterized in that the ring has an axial offset with respect to the clamping members.

14. The device according to claim 9, characterized in that in the region of the clamping members the ring has an axial offset with respect to the portions connecting the clamping members.

* * * * *